United States Patent
Sutardja (10) Patent No.: US 7,634,686 B2
(45) Date of Patent: Dec. 15, 2009

(54) FILE SERVER FOR REDUNDANT ARRAY OF INDEPENDENT DISKS (RAID) SYSTEM

(75) Inventor: Pantas Sutardja, Los Gatos, CA (US)

(73) Assignee: Marvell World Trade Ltd., St. Michael (BB)

( * ) Notice: Subject to any disclaimer, the term of this patent is extended or adjusted under 35 U.S.C. 154(b) by 408 days.

(21) Appl. No.: 11/591,325

(22) Filed: Nov. 1, 2006

(65) Prior Publication Data

US 2008/0022156 A1   Jan. 24, 2008

Related U.S. Application Data

(60) Provisional application No. 60/820,180, filed on Jul. 24, 2006.

(51) Int. Cl.
*G06F 11/00* (2006.01)
(52) U.S. Cl. .................... 714/6; 714/758; 711/114
(58) Field of Classification Search ............... None
See application file for complete search history.

(56) References Cited

U.S. PATENT DOCUMENTS

| | | | |
|---|---|---|---|
| 4,989,206 A | | 1/1991 | Dunphy |
| 5,469,453 A * | | 11/1995 | Glider et al. ............... 714/6 |
| 6,243,824 B1 * | | 6/2001 | Kakuta et al. ............... 714/3 |
| 6,526,477 B1 * | | 2/2003 | Yuan et al. ............... 711/114 |
| 7,000,143 B2 | | 2/2006 | Moulton et al. |
| 7,234,074 B2 | | 6/2007 | Cohn et al. |
| 7,251,249 B2 | | 7/2007 | Nanduri et al. |
| 7,302,603 B2 | | 11/2007 | Nielsen et al. |
| 2004/0250019 A1 | | 12/2004 | Fujie |
| 2005/0015694 A1 * | | 1/2005 | Hetzler et al. ............... 714/752 |
| 2005/0022052 A1 * | | 1/2005 | Moulton et al. ............... 714/6 |
| 2005/0223272 A1 * | | 10/2005 | Yasuhara ............... 714/7 |
| 2006/0106898 A1 * | | 5/2006 | Frondozo et al. ............... 707/204 |
| 2006/0123193 A1 * | | 6/2006 | Nakamura ............... 711/114 |
| 2008/0016416 A1 * | | 1/2008 | Hetzler et al. ............... 714/710 |
| 2008/0256183 A1 * | | 10/2008 | Flynn et al. ............... 709/204 |

FOREIGN PATENT DOCUMENTS

WO   A 0 730 229   9/1996

OTHER PUBLICATIONS

Microsoft Computer Dictionary, Microsoft Press, 4th Ed. 1999, p. 429.*
Notification of Transmittal of The International Search Report and The Written Opinion of The International Searching Authority, or The Declaration dated Apr. 21, 2009 in reference to PCT/US2007/016159.

* cited by examiner

*Primary Examiner*—Christopher S McCarthy (57) ABSTRACT

A redundant array of independent disks (RAID) system comprises N storage arrays. Each of the N storage arrays comprise a target processing module and 1 to M hard disk drives, where M and N are integers greater than 1. A data processing module assigns a first data storage request for a first data block to one of the target processing modules for processing of error checking and correcting (ECC) data for the first data block. The one of the target processing modules sends a first portion of the first data block and ECC data associated with the first data block to another of the target processing modules.

55 Claims, 11 Drawing Sheets

FILE SERVER FOR REDUNDANT ARRAY OF INDEPENDENT DISKS (RAID) SYSTEM

CROSS-REFERENCE TO RELATED APPLICATIONS

This application claims the benefit of U.S. Provisional Application No. 60/820,180, filed on Jul. 24, 2006. The disclosure of the above application is incorporated herein by reference in its entirety.

FIELD

The present disclosure relates to redundant arrays of independent disks (RAID) systems.

BACKGROUND

The Background description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

A redundant array of independent disks (RAID) system redundantly stores data on multiple hard disks. In some RAID levels, data blocks are split and stored on different disks, which reduces data storage and retrieval latency. Multiple disks also tend to increase mean time between failures (MTBF) and increases fault tolerance.

The RAID system appears to an accessing or host device as a single logical hard disk drive. The RAID system may employ disk striping, which involves partitioning the storage space of each drive into units. The size of the units will vary depending upon the application from a sector (512 bytes) up to several megabytes. The stripes of all the disks are typically interleaved and addressed in order.

There are many types of RAID systems in addition to a non-redundant array (RAID-0). In RAID-0, striping is employed without redundancy of data. It offers the best performance but no fault-tolerance. In RAID-1, disk mirroring is used without striping and at least two drives are required to allow duplication during storage of data. Read performance is improved since either disk can be read at the same time. Write performance is the same as single disk storage. RAID-1 provides the best performance and the best fault-tolerance in a multi-user system.

In RAID-2, striping across disks is used. Some disks store error checking and correcting (ECC) information. In RAID-3, striping is used and one drive is dedicated to storing parity information. The embedded error checking (ECC) information is used to detect errors. Data recovery is accomplished by calculating the exclusive OR (XOR) of the information recorded on the other drives. Since an I/O operation addresses all drives at the same time, RAID-3 cannot overlap I/O. As a result, RAID-3 is best for single-user systems with long record applications.

In RAID-4, large stripes are used. Records can be read from any single drive. This allows overlapped I/O for read operations. Since write operations update the parity drive, no I/O overlapping is possible. In RAID-5, a rotating parity array is used, which addresses write limitations of RAID-4. Thus, read and write operations can be overlapped. RAID-5 stores parity information but does not use redundant data. However, the parity information can be used to reconstruct data. RAID-5 requires at least three and usually five disks for the array. RAID-5 is best for multi-user systems in which performance is not critical or which do few write operations.

RAID-6 is similar to RAID-5 except that a second parity scheme that is distributed across different drives is used. RAID-6 offers high fault- and drive-failure tolerance. In RAID-7, a real-time embedded operating system and controller are used. RAID-7 uses caching via a high-speed bus and other characteristics of a stand-alone computer.

RAID-10 combines RAID-0 and RAID-1. There are two subtypes: In RAID-0+1, data is organized as stripes across multiple disks, and then the striped disk sets are mirrored; and in RAID-1+0, the data is mirrored and the mirrors are striped.

In RAID-50 (or RAID-5+0), a series of RAID-5 groups are used. The groups are striped in RAID-0 fashion to improve RAID-5 performance without reducing data protection. In RAID-53 (or RAID-5+3), striping (in RAID-0 style) is used for RAID-3's virtual disk blocks. This offers higher performance than RAID-3 but at much higher cost.

When the host device sends a data block for storage, RAID processing is performed for the selected RAID approach. The RAID processing may include redundancy and recovery processing (such as error checking and correcting (ECC)) for the selected RAID level and/or other processing.

In one approach, a single central processing unit (CPU) receives data blocks from another device. The CPU handles all of the RAID processing including ECC. With this approach, the CPU can often rate-limit data storage since processing relating to ECC can be variable and time consuming. In other words, processing in the CPU may cause a bottleneck and increase latency. With a single CPU, the RAID construction for one data block needs to be completed before a subsequent data block can be processed.

SUMMARY

A redundant array of independent disks (RAID) system comprises N storage arrays, wherein each of the N storage arrays comprise a target processing module and 1 to M hard disk drives, where M and N are integers greater than 1. A data processing module assigns a first data storage request for a first data block to one of the target processing modules for processing of error checking and correcting (ECC) data for the first data block. The one of the target processing modules sends a first portion of the first data block and ECC data associated with the first data block to another of the target processing modules.

In other features, the ECC data received by the another of the target processing modules corresponds to the first portion. An interface that receives the first data block and that forwards the first data block to the data processing module. The interface comprises at least one of a network interface, a Gigabit Ethernet network interface and a data bus. A switch module switches data between the data processing module and the N storage arrays and between the N storage arrays. The switch module comprises a multi-port high speed switch. The data processing module assigns a second data storage request for a second data block to a second target processing module for processing of ECC data for the second data block, wherein the second target processing module sends a first portion of the second data block and ECC data associated with the second data block to a third one of the target processing modules. The first and second data blocks are processed in an overlapping manner in the one of the target processing modules and the second target processing modules, respectively.

In other features, the data processing module comprises an interface, memory, and at least one processor. The data processing module performs file system (FS) protocol functions on the first data block. The FS protocol comprises at least one of Network File Server (NFS) and Common Internet File Server (CIFS). The data processing module determines a level of RAID storage to be applied to the first data block. The data processing module maps the first data block to selected ones of the N storage arrays and updates a storage map for the N storage arrays.

In other features, when the data processing module receives a data retrieval request, the data processing module assigns the data retrieval request to a first one of the target processing modules. The first one of the target processing modules retrieves data corresponding to the data retrieval request from others of the target processing modules and ECC data relating to portions of the data having errors.

In other features, the first one of the target processing modules performs data recovery on the portions using the ECC data. When the data processing module receives a data retrieval request, the data processing module sends data retrieval messages to the target processing modules having data corresponding to the data retrieval request. The target processing modules retrieve the data corresponding to the data retrieval request and ECC data relating to portions of the data having errors. The target processing modules send the retrieved data corresponding to the data retrieval request and the ECC data to the data processing module, and wherein the data processing module performs data recovery on the portions using the ECC data. The target processing modules perform data recovery on the portions using the ECC data.

A redundant array of independent disks (RAID) system comprises N storage arrays, wherein each of the N storage arrays comprise a target processing module and 1 to M hard disk drives, where M and N are integers greater than 1. A data processing module selectively assigns error checking and correcting (ECC) processing for data blocks to selected ones of the target processing modules in a non-overlapping manner. A switch module provides communication paths between the data processing module and the N storage arrays and between each one of the N storage arrays and others of the N storage arrays.

In other features, the data processing module assigns a data storage request for a first data block to one of the target processing modules for processing of ECC data for the first data block, and wherein the one of the target processing modules sends a first portion of the first data block and ECC data associated with the first data block to another of the target processing modules. The ECC data received by the another of the target processing modules corresponds to the first portion. An interface receives the data blocks and forwards the data blocks to the data processing module. The interface comprises at least one of a network interface, a Gigabit Ethernet network interface and a data bus.

In other features, the switch module comprises a multi-port high speed switch. The switch module includes a multi-port switch that operates at speeds greater than or equal to 1 Gigabit per second. The switch module includes a multi-port Gigabit Ethernet switch. The data processing module assigns a second data storage request for a second data block to a second target processing modules for processing of ECC data for the second data block. The second target processing module sends a first portion of the second data block and ECC data associated with the second data block to a third one of the target processing modules.

In other features, the first and second data blocks are processed in an overlapping manner in the one of the target processing modules and the second target processing modules, respectively. The data processing module comprises an interface, memory, and at least one processor, and wherein the data processing module performs file system (FS) protocol functions on the first data block. The FS protocol comprises at least one of Network File Server (NFS) and Common Internet File Server (CIFS). The data processing module determines a level of RAID storage to be applied to the data blocks. The data processing module maps the data blocks to selected ones of the N storage arrays and updates a storage map for the N storage arrays.

In other features, when the data processing module receives a data retrieval request, the data processing module assigns the data retrieval request to a first one of the target processing modules. The first one of the target processing modules requests data corresponding to the data retrieval request from others of the target processing modules and ECC data relating to portions of the data having errors. The first one of the target processing modules performs data recovery on the portions using the ECC data.

In other features, when the data processing module receives a data retrieval request, the data processing module sends data retrieval messages to the target processing modules having data corresponding to the data retrieval request. The target processing modules retrieve the data corresponding to the data retrieval request and ECC data relating to portions of the data having errors. The target processing modules send the retrieved data corresponding to the data retrieval request and the ECC data to the data processing module, and wherein the data processing module performs data recovery on the portions using the ECC data. The target processing modules perform data recovery on the portions using the ECC data.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Figure 1:
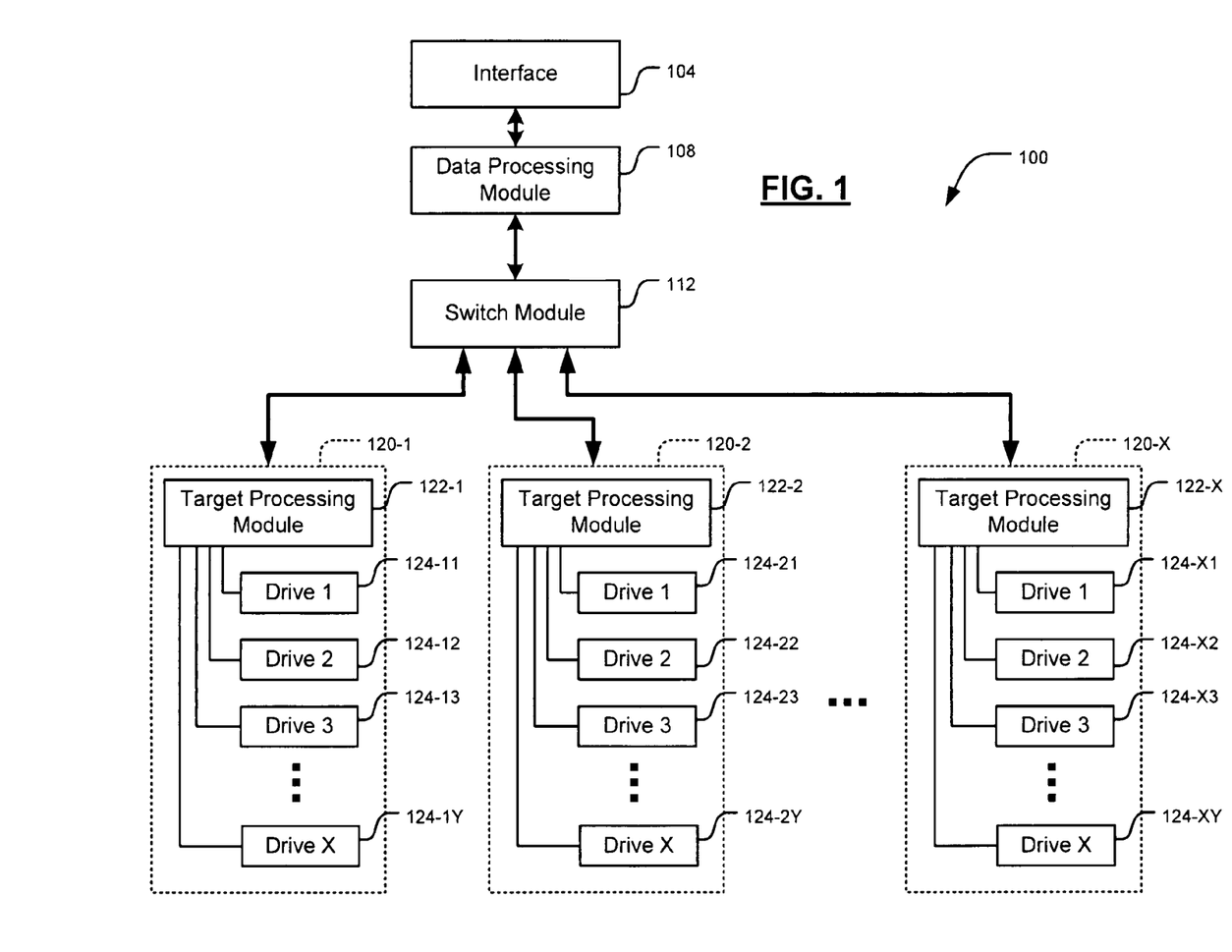
FIG. 1 is a functional block diagram of a RAID system according to the present disclosure.

Referring now to FIG. 1, a redundant array of independent disks (RAID) system 100 is shown. An interface 104 receives blocks of data for storage in the RAID system 100. For example, the interface 104 may be a high speed interface such as Gigabit Ethernet network interface, a data bus, etc., although any other type of interfaces may be used. A data processing module 108 performs part of the RAID processing. In other words, the data processing module 108 receives the data blocks from the interface 104 and performs operating system (OS) and file system (FS) protocol functions on the data. For example, the FS protocol may include Network File Server (NFS), Common Internet File Server (CIFS) and/or other suitable protocols. The data processing module 108 distributes redundancy and recovery processing (such as error checking and correcting (ECC)) to other target processing devices as will be described below.

The data processing module 108 communicates with a switch module 112. For example only, the switch module 112 may be a multi-port high speed switch such as a crossbar switch, a Gigabit switch or a Gigabit Ethernet switch. The switch module 112 may switch data organized as data packets. As can be appreciated, the switch module 112 provides scalability and flexibility as compared to hardwired connections.

The switch module 112, in turn, communicates with two or more storage arrays 120-1, 120-2, ..., and 120-X (collectively storage arrays 120), where X is an integer greater than 1. Each of the storage arrays 120 includes target processing modules 122-1, 122-2, ..., and 122-X, respectively, (collectively target processing modules 122) and one or more hard disk drives (HDDs) 124-11, 124-12, ..., and 124-XY, (collectively HDDs 124) where Y is an integer greater than zero. As can be appreciated, the number of storage arrays 120 and HDDs 124 in each storage array 120 may be varied to allow scaling.

Figure 2A:
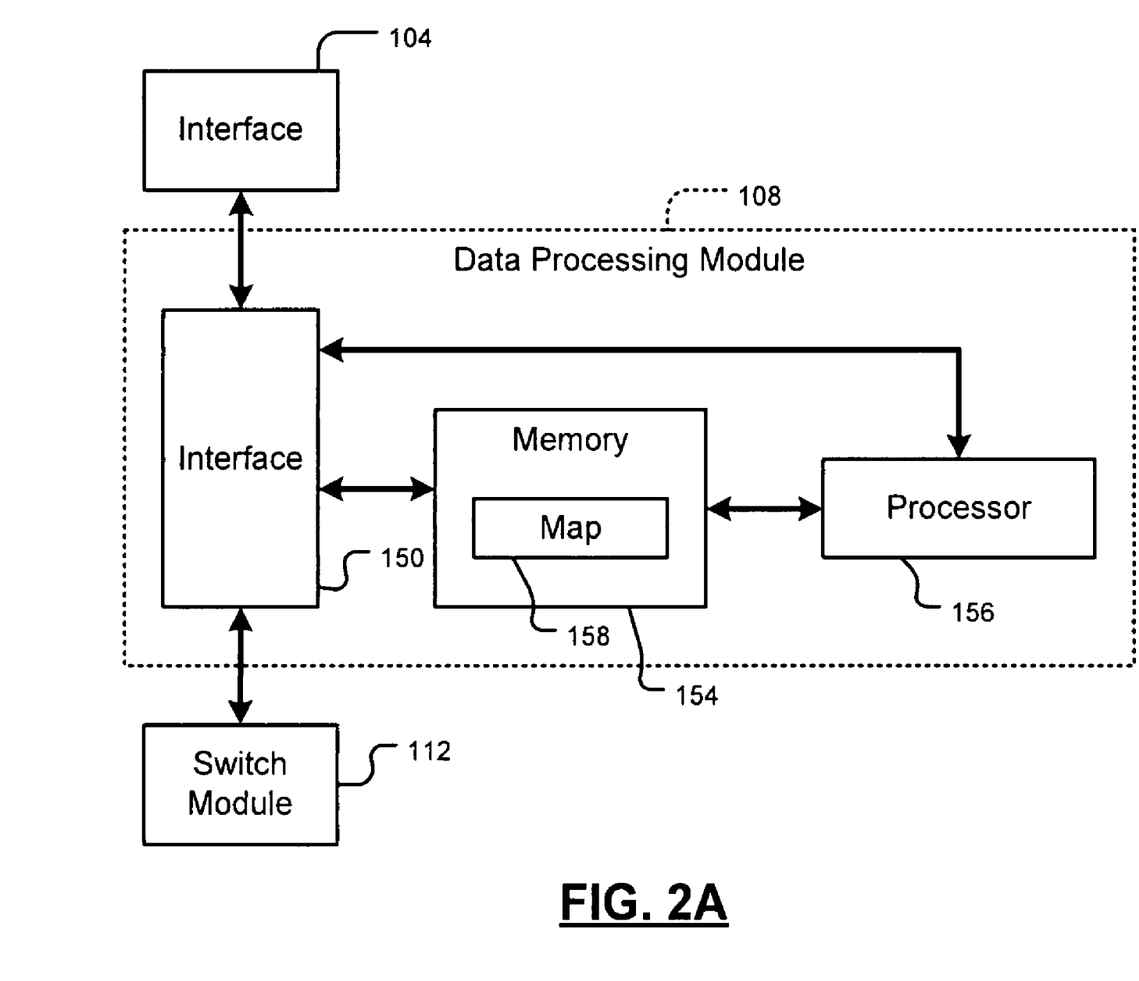
FIG. 2A is a functional block diagram of a data processing module.

Referring now to FIG. 2A, an exemplary data processing module 108 is shown in further detail. The data processing module 108 receives data blocks for data storage via the interface 104. The data processing module 108 may include an interface 150, memory 154, and one or more processors 156.

The data processing module 108 may determine a level of RAID storage to be applied, handle FS-related processing, may map the data blocks to the storage arrays, assign RAID redundancy and recovery processing (such as error checking and correcting (ECC)) to a selected target processing module, and may update a storage map, etc.

The target processing module 122 that is assigned to perform the RAID redundancy and recovery processing receives instructions from the data processing module 108. The selected target processing module 122 generates error checking and correcting (ECC) for the assigned data block. Upon completion, the target processing module 122 performs data spreading by selectively sending portions of the data block and/or ECC data to the other target processing modules for storage in the other arrays based on RAID instructions provided by the data processing module 108. Some data and ECC data may also be stored locally.

Concurrently, other target processing modules 122 can be assigned RAID redundancy and recovery processing for other data blocks. The other target processing modules 122 process ECC for other data blocks in an overlapping manner. Since the data processing module 108 does not handle ECC for any of the data blocks to be stored, the data processing module 108 no longer causes bottlenecks. The memory 154 associated with the data processing module 108 may store and update a global drive map 158 of data in the storage arrays 120.

Figure 2B:
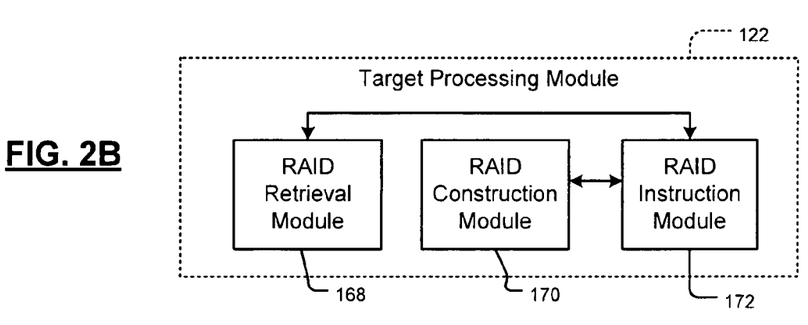
FIG. 2B is a functional block diagram of a target processing module.

Referring now to FIG. 2B, each of the target processing modules 122 may include a RAID construction module 168 and a RAID retrieval module 170. The RAID construction module 168 processes ECC. The RAID retrieval module 170 processes RAID retrieval requests as will be described below.

The RAID construction module 170 processes ECC for portions of the data block that are to be stored on local drives 124 associated with the selected target processing module 122. In addition, the RAID construction module 170 processes ECC for remote drives associated with remote storage arrays 120. A RAID instruction module 172 generates RAID instructions for other target processing and may handle RAID instructions received from other target processing modules 122. The RAID instruction module 172 may be integrated with the RAID construction module 170.

The remote storage arrays 120 associated with target processing modules other than the selected target processing module store the data and/or ECC data received from the selected target processing module. The remote storage arrays 120 may simply follow the RAID instructions sent by the selected target processing module 122.

As can be appreciated, the amount of processing performed by the remote storage arrays 120 is significantly lower than the RAID construction processing performed by the target processing module 122. This allows the target processing modules 122 of the remote storage arrays 120 to be available to process RAID construction for other data blocks in an overlapping manner.

Figure 2C:
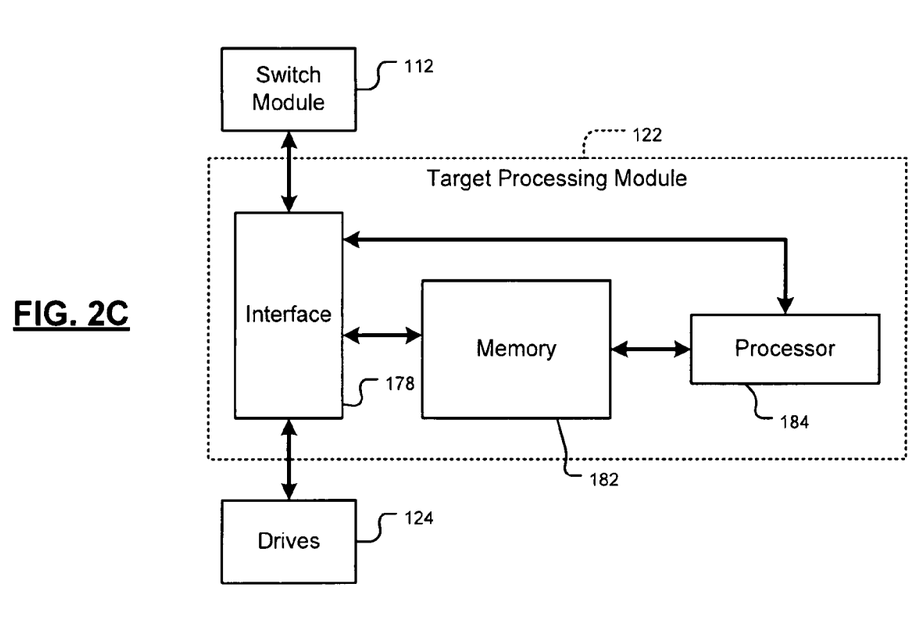
FIG. 2C is a more detailed functional block diagram of an exemplary target processing module.

Referring now to FIG. 2C, an exemplary target processing module 122 is shown in further detail. The target processing module 122 receives requests to perform RAID construction from the data processing module and/or RAID instructions sent by remote target processing modules via the switch module 112. The target processing module 122 includes an interface 178, memory 182 and one or more processors 184.

Figure 3:
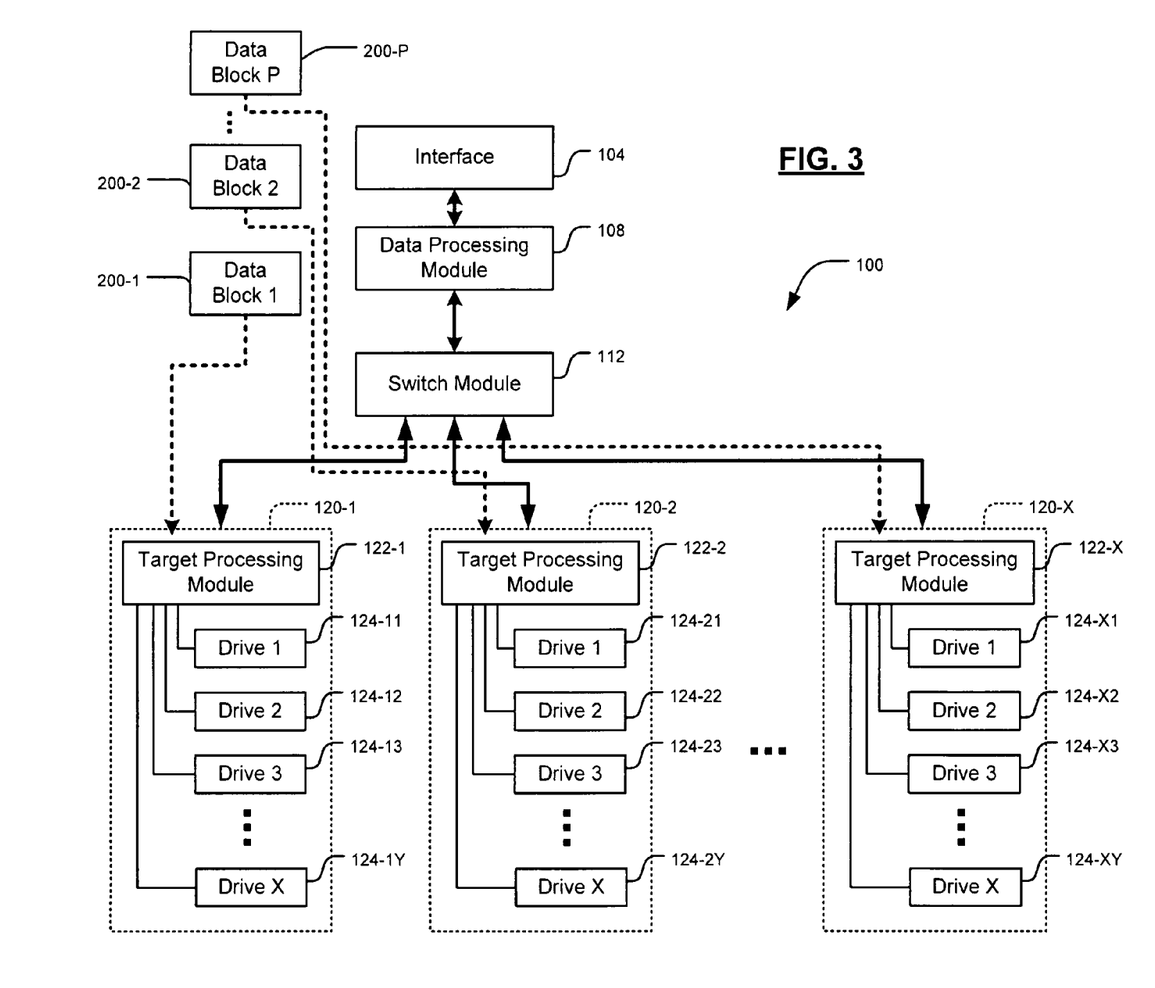
FIG. 3 is a functional block diagram illustrating processing of data blocks.

Referring now to FIG. 3, in use a first data block 200-1 is received via the interface 104 at the data processing module 108. The data processing module 108 performs OS and FS protocol functions on the data block. The data processing module 108 assigns the data block to a target processing module 122 associated with one of the storage arrays 120. Additionally, the data processing module 122 may determine a level of RAID storage to be applied, may map the data blocks to the storage arrays, may update a storage map, etc.

For example, the first data block 200-1 may be assigned to the target processing module 122-1 of the first storage array 120-1. The selected target processing module 122-1 generates ECC for the data block. While storage array 120-1 is generating ECC for the first data block, the data processing module 108 receives a second data block 200-2 via the interface 104. The data processing module 108 assigns the second data block to the target processing module 122-2 associated with the storage array 120-2 for ECC generation.

Overlapping the handling of RAID construction processing for data blocks can continue for additional data blocks 200-P until all of the target processing modules are handling data blocks. As a result, throughput may be significantly increased as compared to other approaches.

Figure 4:
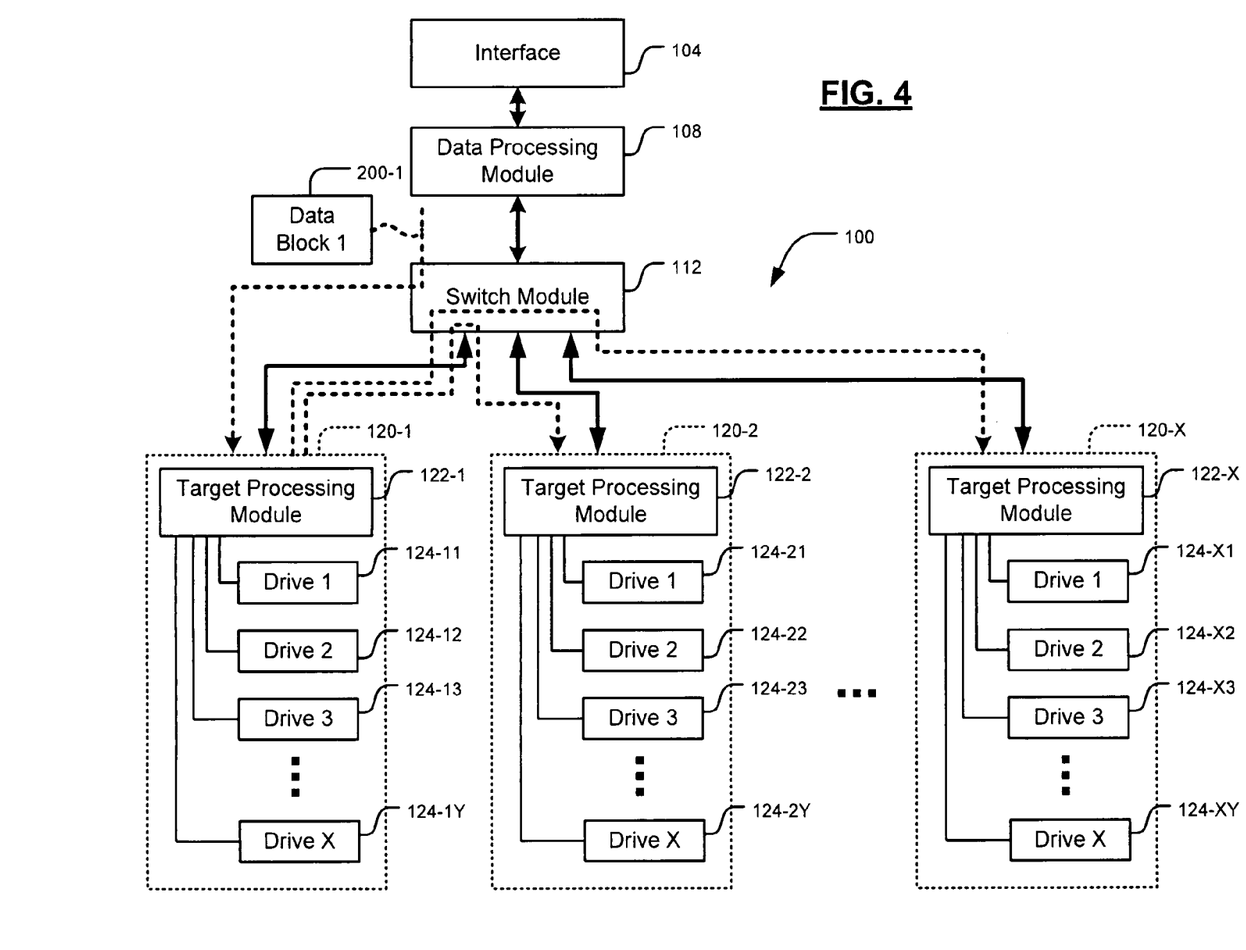
FIG. 4 is a functional block diagram illustrating processing of data blocks.
Figure 5:
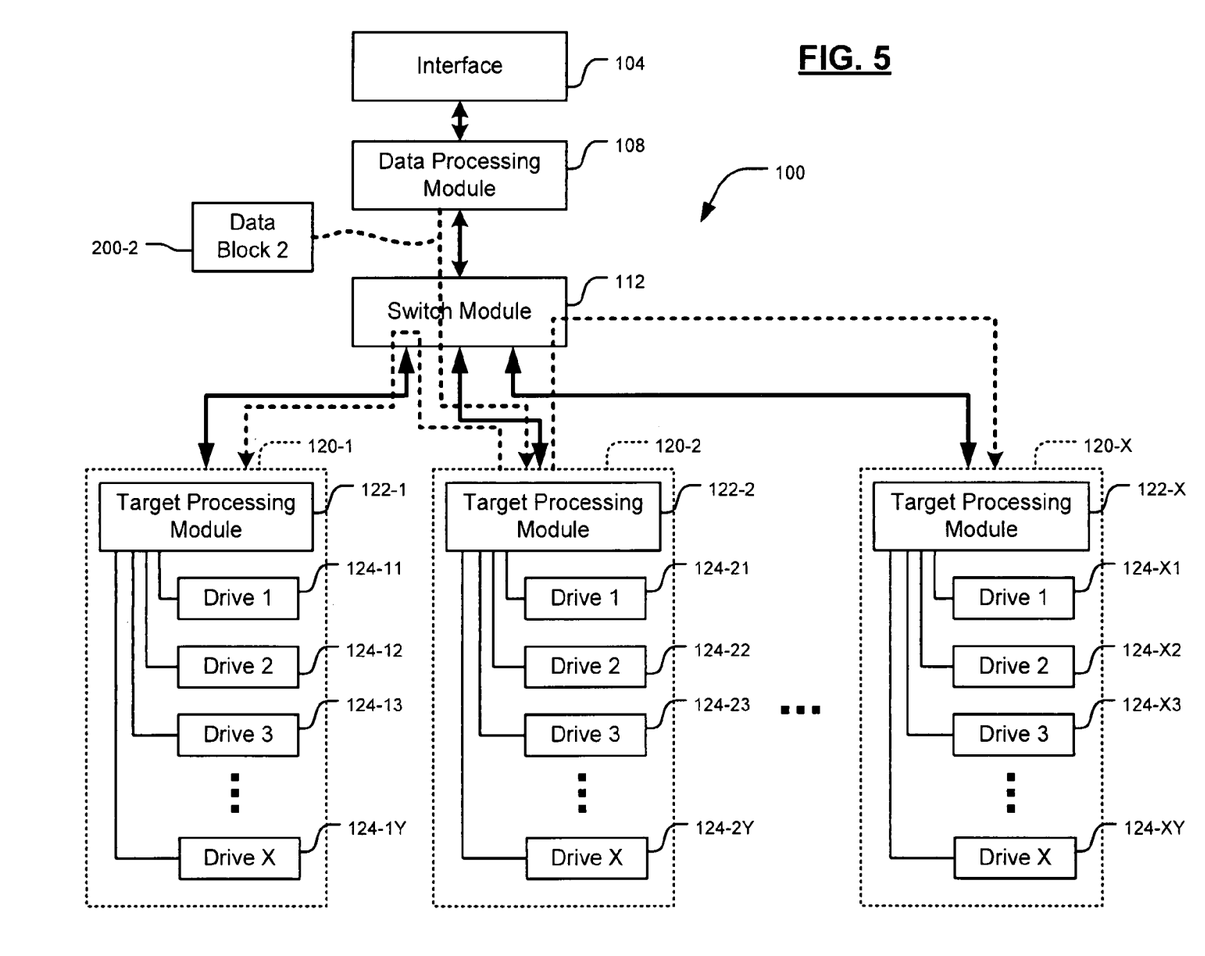
FIG. 5 is a functional block diagram illustrating processing of data blocks.

Referring now to FIGS. 4 and 5, processing of the data block 200-1 is shown in further detail. After processing, the data processing module 108 sends the data block 200-1 to the target processing module 122-1 of the storage array 120-1. The data processing module 108 may also update the drive map. The target processing module 122-1 processes ECC for the data block. The target processing module 122-1 may store some of the data associated with the data block 200-1 on the local drives 124 associated with the storage array 120-1. In addition, the target processing module 122-1 may send RAID instructions, data and/or ECC data to target processing modules 122-2, . . . , and 122-X associated with other storage arrays. The other target processing modules 122-2, . . . , and 122-X in the remote storage arrays 120-2, . . . , and 120-X simply follow the RAID instructions and have limited processing burden, which leaves these target processing modules 122-2, . . . , and 122-X of the remote storage arrays 120-2, . . . , and 120-X free to handle ECC for other data blocks.

In FIG. 5, the data processing module 108 receives a second data block 200-2 while the target processing module 122-1 is processing ECC for the first data block 200-1. The data processing module 108 assigns the second data block 200-2 to the target processing module 122-2 associated with the storage array 120-2. Additional data blocks 200-P can be assigned to target processing modules 122 of other storage arrays 120.

Figure 6:
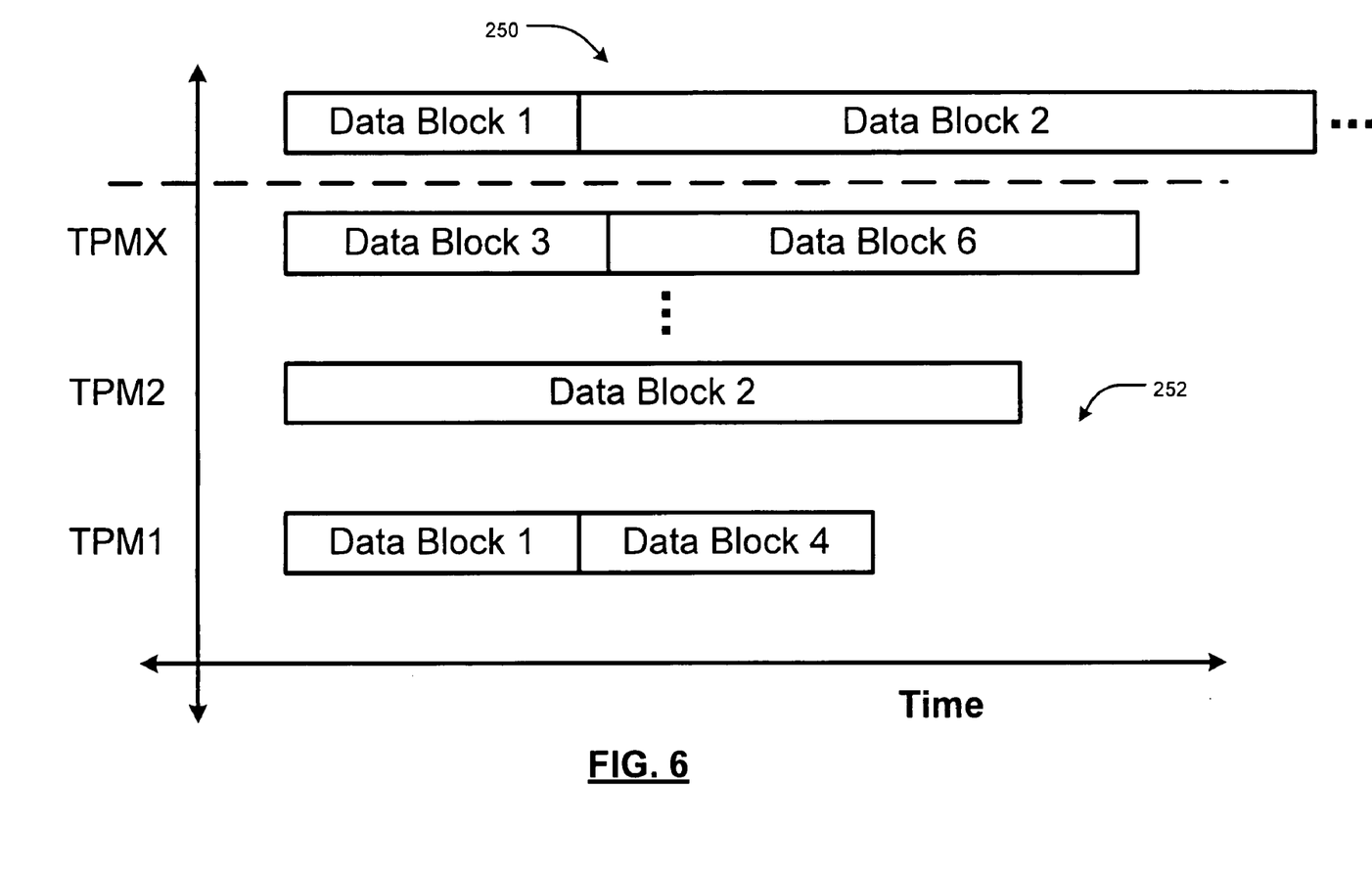
FIG. 6 illustrates timing of processing of data blocks.

Referring now to FIG. 6, exemplary RAID processing of data blocks is shown generally at 250. This type of RAID processing can encounter bottlenecks, which reduces data access and retrieval times. Data processing according to some implementations of the present disclosure is shown at 252. RAID construction for the data blocks may take a variable amount of time. The RAID system according to the present disclosure can continue to handle data blocks even when one of the storage requests is taking a significantly longer amount of time to process.

Figure 7:
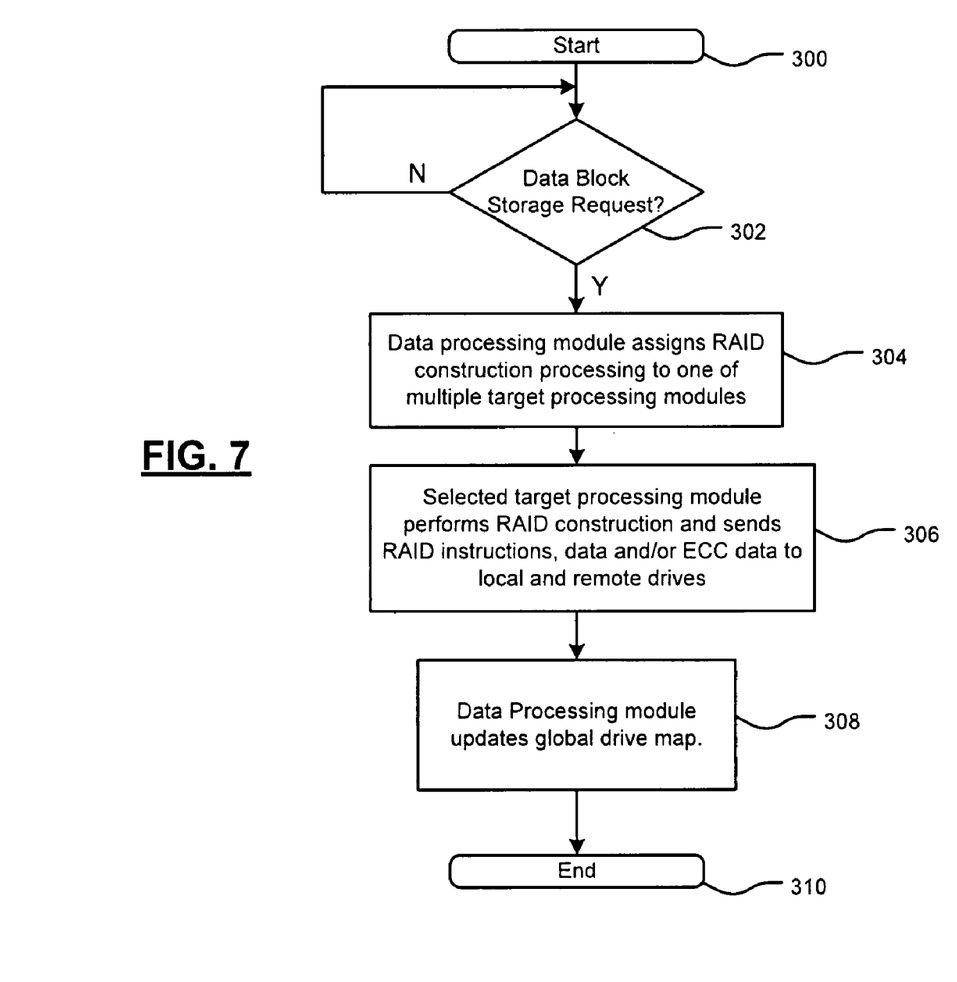
FIG. 7 is a flowchart illustrating a method for processing data blocks for storage.

Referring now to FIG. 7, a method for operating the RAID system during a data storage request is shown. Control begins with step 300. In step 302, control determines whether a data block for storage is received at the data processing module 108. If step 302 is true, the data processing module 108 assigns the ECC processing for the data block to one of multiple target processing modules 122 in step 304. The data processing module 108 may also update the global drive map and may perform other functions described above. In step 306, the selected target processing module processes the ECC for the data block. The selected target processing module may send RAID instructions, data and/or ECC data to remote target processing modules associated with remote storage arrays. Control ends with step 310.

Referring now to FIGS. 8A-10, various exemplary methods for data retrieval are illustrated. For data retrieval, ECC processing may be performed when errors are detected upon retrieval. The errors may be detected by the hard disk drive storing a sub-block associated with the error. Once detected, the ECC recovery can be performed locally by the same target processing modules, by a selected one of the target processing modules and/or by the data processing module.

Figure 8A:
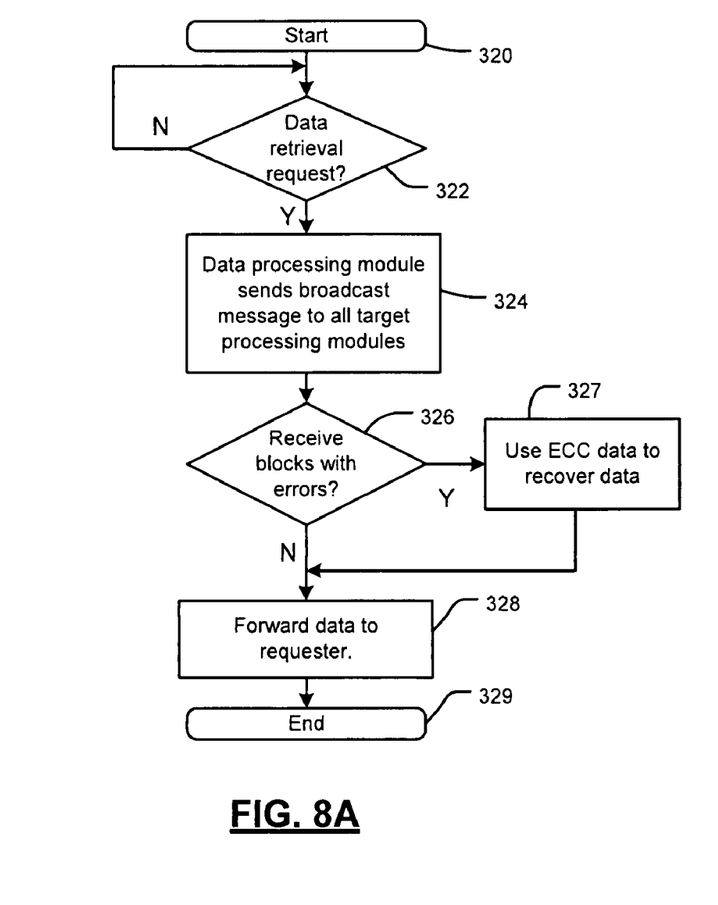
FIGS. 8A and 8B are flowcharts illustrating exemplary methods for retrieving data blocks with ECC processing performed by the data processing module.
Figure 8B:
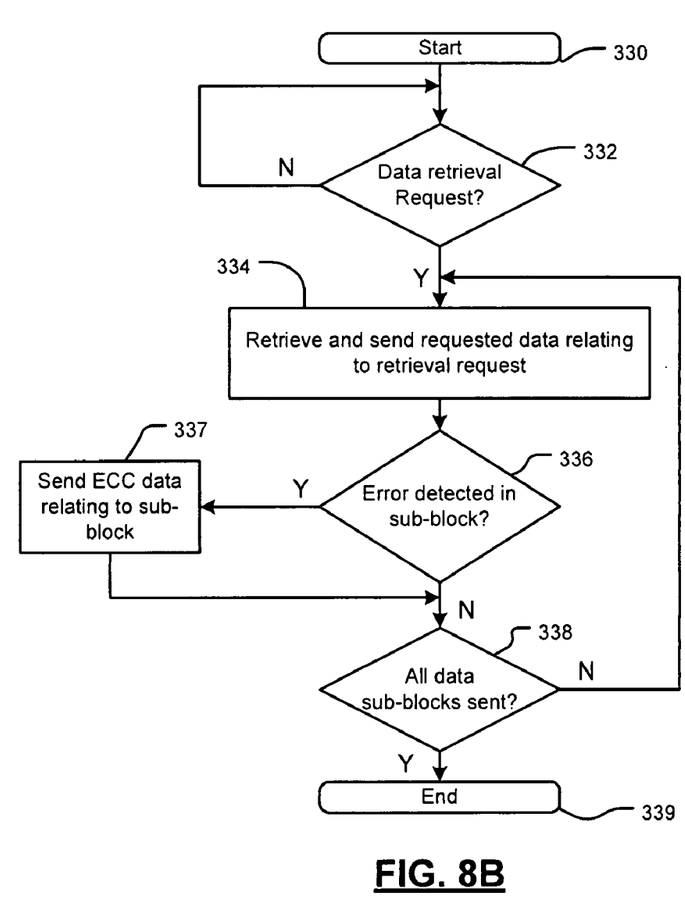

In FIGS. 8A and 8B, flowcharts illustrating exemplary methods for retrieving data blocks are shown. In this implementation, the ECC processing for data having ECC errors is performed by the data processing module. In FIG. 8A, control begins step 320 and proceeds to step 322 where the data processing module determines whether a data retrieval request has been received. If step 322 is true, the data processing module sends a broadcast message to all of the target processing modules having data associated with the data retrieval request in step 324. Alternately, the data processing module can use the map and send individual messages to each of the target processing modules individually.

In step 326, the data processing module determines whether it has received data blocks from the target processing modules with errors (and corresponding ECC data for the data with errors). If step 326 is true, the data processing module uses the ECC data to recover the data. Steps 326 and 327 continue with step 328 where the data processing module sends the corrected data to the requester. If the errors cannot be corrected, the data processing module may send an error message and/or retry retrieval. Control ends in step 329.

In FIG. 8B, control begins with step 330 and proceeds to step 332. In step 332, the target processing module determines whether it has received a data retrieval request from the data processing module. In step 334, the target processing module retrieves and sends data relating to the retrieval request to the data processing module. In step 336, the target processing module determines whether there are errors detected in a sub-block. If step 336 is true, the target processing module sends the ECC data relating to the sub-block to the data processing module. Steps 336 and 337 continue with step 338 where control determines whether all of the data has been sent relating to the data retrieval request. If not, control returns to step 334. If step 338 is true, control ends with step 339.

Figure 9A:
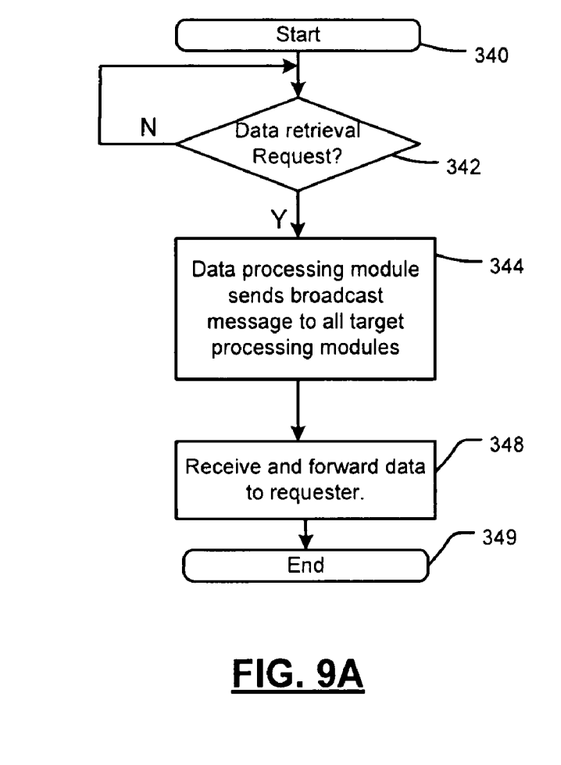
FIGS. 9A and 9B are flowcharts illustrating exemplary methods for retrieving data blocks with ECC processing performed by a respective ones of the target processing modules.
Figure 9B:
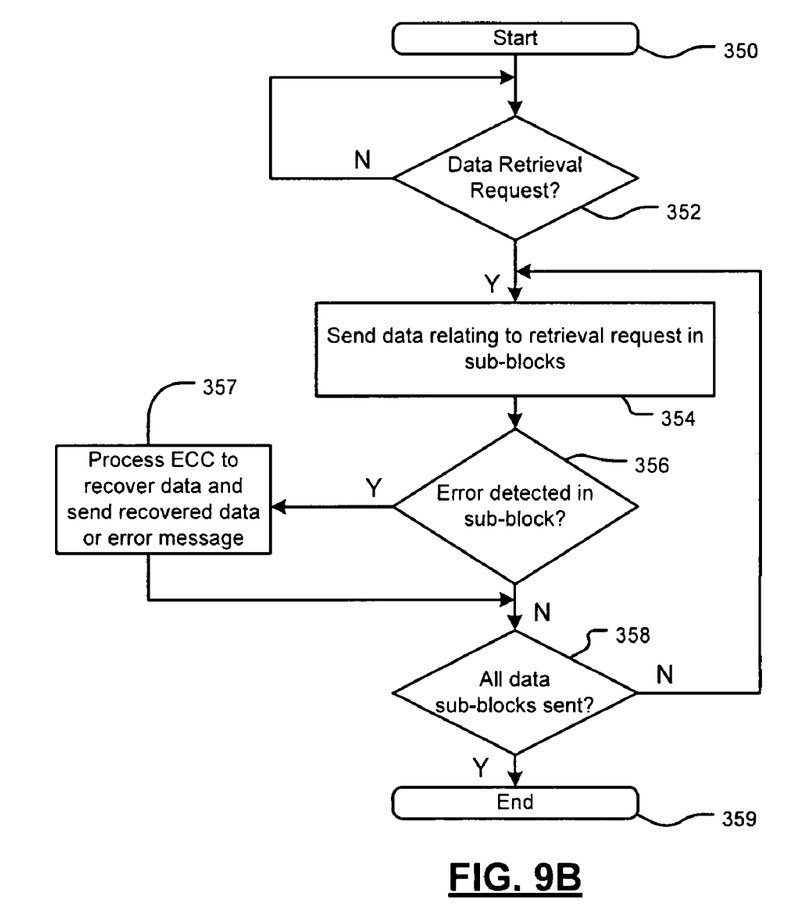

In FIGS. 9A and 9B, flowcharts illustrating exemplary methods for retrieving data blocks are shown. In this implementation, the ECC processing is performed by respective ones of the target processing modules that store the data. In FIG. 9A, control begins with step 340. In step 342, the data processing module determines whether it has received a data retrieval request. If step 342 is true, the data processing module sends a broadcast message to all of the target processing modules in step 334. Alternately, the data processing module may send individual messages to the target processing modules based on the map. In step 348, the data processing module receives and forwards the data to the requester. Control ends with step 349.

In FIG. 9B, control begins with step 350. In step 352, the target processing module determines whether it has received a data retrieval request. If step 352 is true, the target processing module sends the data relating to the retrieval request in sub-blocks to the data processing module in step 354. In step 356, control determines whether errors have been detected in the sub-blocks. If step 356 is true, control continues with step 357 and processes the ECC to recover data and sends the recovered data. If the data cannot be recovered, an error message may be sent and/or retry performed. Control continues from steps 356 and 357 with step 358. In step 358, control determines whether all of the sub-blocks associated with the data retrieval request have been sent. If not, control returns to step 354. Otherwise control ends with step 359.

Figure 10:
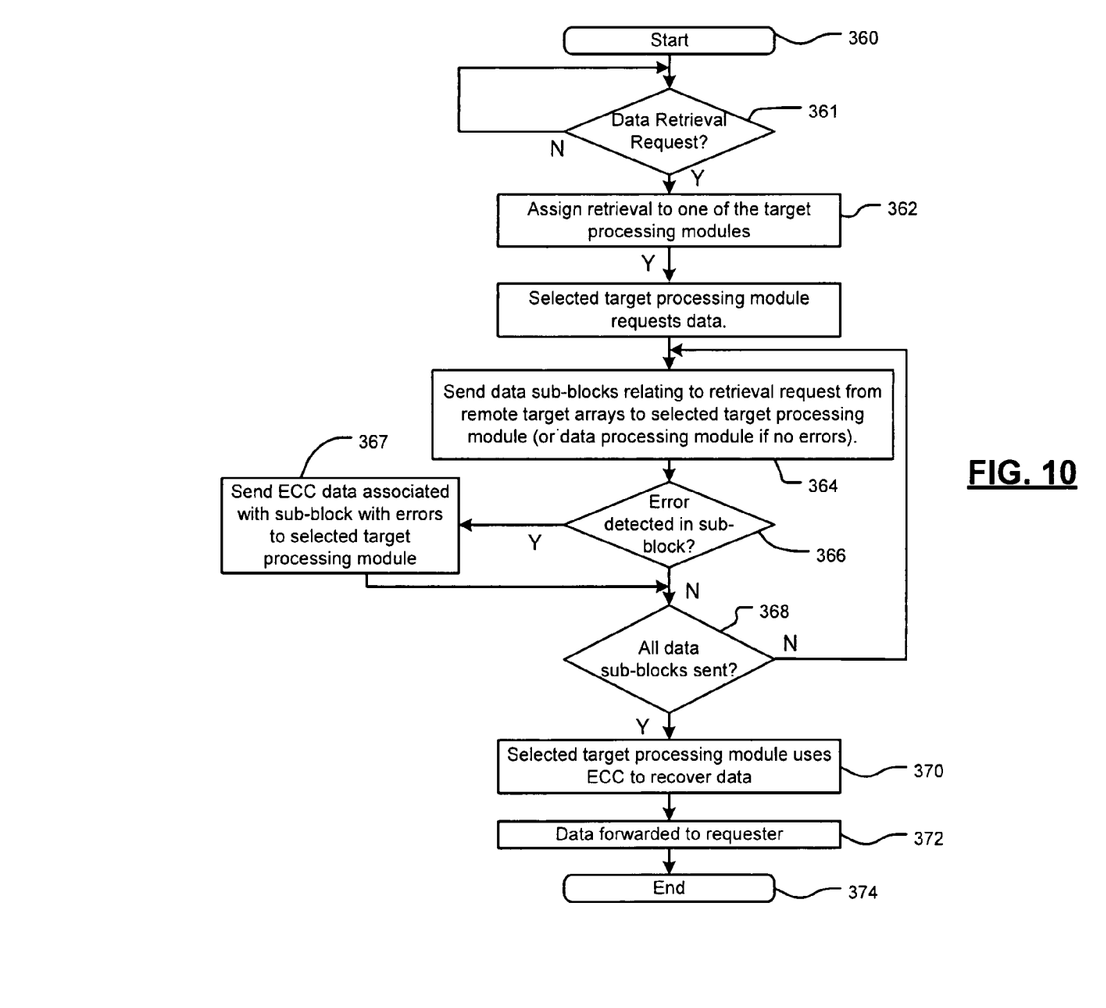
FIG. 10 is a flowchart illustrating an exemplary method for retrieving data blocks with ECC processing performed by a selected one of the target processing modules.

In FIG. 10, a flowchart illustrating an exemplary method for retrieving data blocks with ECC processing is shown. In this implementation, data recovery may be performed by a selected one of the target processing modules. Control begins with step 360 and proceeds to step 361. In step 361, the data processing module determines whether it has received a data retrieval request. If step 361 is true, the data processing module assigns the data retrieval to one of the target processing modules in step 362. The selected target processing module and/or the data processing module requests data from the remote target processing modules.

In step 364, the remote target processing modules send data sub-blocks relating to the retrieval request to the selected target processing module. Likewise, the selected target processing module retrieves data relating to the retrieval request from local drives. Alternately, the remote target processing modules may send the data directly to the data processing module if there are no errors. If there are errors, the remote target processing modules may send the data to the selected target processing module for data recovery.

For each of the remote target processing modules, the remote target processing modules determine whether errors have been detected in one of the data sub-blocks in step 366. If step 366 is true, the remote target processing modules send ECC data associated with the sub-block with errors to the selected target processing module. The data sub-blocks without errors may be sent to the target processing module or the data processing module.

Control continues from steps 366 and 367 with step 368. In step 368, control associated with the remote target processing modules determines whether all of the data sub-blocks have been sent. In step 370, the selected target processing module to uses the ECC data for data recovery, in other words to correct the errors. The selected target processing module forwards the data to the data processing module. The data processing module forwards the recovered data to the requesting device in step 372.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A redundant array of independent disks (RAID) system comprising:
   N storage arrays, wherein each of said N storage arrays comprises:
      a target processing module; and
      M hard disk drives, where M and N are integers greater than 1; and
   a data processing module that is distinct from said target processing modules and that assigns a first data storage request for a first data block to one of said target processing modules of said N storage arrays for processing of error checking and correcting (ECC) data for said first data block, and
   wherein said one of said target processing modules sends a first portion of said first data block and EGG data associated with said first data block to another of said target processing modules, and
   wherein said data processing module receives said first data block from a host device that is distinct from said RAID system.

2. The RAID system of claim 1, wherein said ECC data received by said another of said target processing modules corresponds to said first portion.

3. The RAID system of claim 1, further comprising an interface that receives said first data block and forwards said first data block to said data processing module.

4. The RAID system of claim 3, wherein said interface comprises at least one of a network interface, a Gigabit Ethernet network interface, and a data bus.

5. The RAID system of claim 1, further comprising a switch module that switches data between said data processing module and said N storage arrays, and between said N storage arrays.

6. The RAID system of claim 5, wherein said switch module comprises a multi-port high speed switch.

7. The RAID system of claim 1, wherein said data processing module assigns a second data storage request for a second data block to a second target processing module for processing of ECC data for said second data block, and
   wherein said second target processing module sends a first portion of said second data block and ECC data associated with said second data block to a third one of said target processing modules.

8. The RAID system of claim 7, wherein said first data block and said second data block are processed in an overlapping manner in said one of said target processing modules and said second target processing module, respectively.

9. The RAID system of claim 1, wherein said data processing module comprises an interface, memory, and at least one processor.

10. The RAID system of claim 1, wherein said data processing module performs file system (FS) protocol functions on said first data block.

11. The RAID system of claim 10, wherein said FS protocol functions comprise at least one of a Network File Server (NFS) protocol function and a Common Internet File Server (CIFS) protocol function.

12. The RAID system of claim 1, wherein said data processing module determines a level of RAID storage to be applied to said first data block.

13. The RAID system of claim 12, wherein said level of RAID storage identifies whether said RAID system performs striping, disk mirroring, and parity storage.

14. The RAID system of claim 1, wherein said data processing module maps said first data block to selected ones of said N storage arrays and updates a storage map for said N storage arrays.

15. The RAID system of claim 1, wherein when said data processing module receives a data retrieval request, said data processing module assigns said data retrieval request to a first one of said target processing modules of said N storage arrays,
   wherein said first one of said target processing modules retrieves data corresponding to said data retrieval request from others of said target processing modules and ECC data relating to portions of said data having errors, and
   wherein said first one of said target processing modules performs data recovery on said portions using said ECC data.

16. The RAID system of claim 1, wherein when said data processing module receives a data retrieval request, said data processing module sends data retrieval messages to said target processing modules of said N storage arrays having data corresponding to said data retrieval request.

17. The RAID system of claim 16, wherein said target processing modules retrieve said data corresponding to said data retrieval request and ECC data relating to portions of said data having errors.

18. The RAID system of claim 17, wherein said target processing modules send said retrieved data corresponding to said data retrieval request and said ECC data to said data processing module, and wherein said data processing module performs data recovery on said portions using said ECC data.

19. The RAID system of claim 17, wherein said target processing modules perform data recovery on said portions using said ECC data.

20. The RAID system of claim 1, wherein said data processing module receives said first data block from said host device via an Internet.

21. The RAID system of claim 1, wherein said data processing module processes said first data block using at least one of operating system and file system protocol functions and assigns RAID redundancy and recovery processing to a selected one of said target processing modules.

22. The RAID system of claim 1, wherein said data processing module maintains a map of data blocks stored in said N storage arrays and shares said map with said target processing modules.

23. The RAID system of claim 1, wherein said data processing module selects one of said target processing modules of said N storage arrays, and
assigns RAID redundancy and recovery processing to said selected one of said target processing modules.

24. The RAID system of claim 1, wherein said data processing module performs error correction code processing to recover said first data block after storage in said N storage arrays.

25. A redundant array of independent disks (RAID) system comprising:
N storage means for storing, wherein each of said N storage means comprises:
target processing means for processing; and
M hard disk drives, where M and N are integers greater than 1; and
data processing means for assigning a first data storage request for a first data block to one of said target processing means for processing of error checking and correcting (ECC) data for said first data block, and
wherein said one of said target processing means sends a first portion of said first data block and ECC data associated with said first data block to another of said target processing means, and
wherein said data processing means is distinct from said target processing means and receives said first data block from a host device that is distinct from said RAID system.

26. The RAID system of claim 25, wherein said ECC data received by said another of said target processing means corresponds to said portion.

27. The RAID system of claim 25, further comprising interface means for receiving said first data block and for forwarding said first data block to said data processing means.

28. The RAID system of claim 27, wherein said interface means comprises at least one of a network interface, a Gigabit Ethernet network interface, and a data bus.

29. The RAID system of claim 25, further comprising switching means for switching data between said data processing means and said N storage means, and between said target processing means.

30. The RAID system of claim 29, wherein said switching means comprises a multi-port high speed switch.

31. The RAID system of claim 25, wherein said data processing means assigns a second data storage request for a second data block to second target processing means for processing of error checking and correcting (ECC) data for said second data block, and
wherein said second target processing means sends a portion of said second data block and ECC data associated with said second data block to a third one of said target processing means.

32. The RAID system of claim 31, wherein processing of said first data block and said second data block overlap in said one of said target processing means and said second target processing means, respectively.

33. The RAID system of claim 25, wherein said data processing means comprises interface means for providing an interface, storing means for storing, and at least one processing means for processing.

34. The RAID system of claim 25, wherein said data processing means performs file system (FS) protocol functions on said first data block.

35. The RAID system of claim 34, wherein said FS protocol functions comprise at least one of a Network File Server (NFS) protocol function and a Common Internet File Server (CIFS) protocol function.

36. The RAID system of claim 25, wherein said data processing means determines a level of RAID storage to be applied to said first data block.

37. The RAID system of claim 25, wherein said data processing means maps said first data block to selected ones of said N storage arrays and updates a storage map of said N storage arrays based on said mapping.

38. The RAID system of claim 25, wherein when said data processing means receives a data retrieval request, said data processing means assigns said data retrieval request to a first one of said target processing means,
wherein said first one of said target processing means retrieves data corresponding to said data retrieval request from others of said target processing means and ECC data relating to portions of said retrieved data having errors, and
wherein said first one of said target processing means performs data recovery on said portions using said ECC data.

39. The RAID system of claim 25, wherein when said data processing means receives a data retrieval request, said data processing means sends data retrieval messages to said target processing means having data corresponding to said data retrieval request.

40. The RAID system of claim 39, wherein said target processing means retrieve said data corresponding to said data retrieval request and ECC data relating to portions of said data having errors.

41. The RAID system of claim 40, wherein said target processing means performs data recovery on said portions using said ECC data.

42. The RAID system of claim 40, wherein said target processing means send said retrieved data corresponding to said data retrieval request and said ECC data to said data processing means, and wherein said data processing means performs data recovery on said portions using said ECC data.

43. A method for operating a redundant array of independent disks (RAID) system comprising:
  providing N storage arrays, wherein each of said N storage arrays comprises:
    a target processing module; and
    M hard disk drives, where M and N are integers greater than 1;
  assigning, via a data processing module that is distinct from said target processing module, a first data storage request for a first data block to one of said target processing modules of said N storage arrays for processing of error checking and correcting (ECC) data for said first data block;
  sending a portion of said first data block and ECC data associated with said first data block from said one of said target processing modules to another of said target processing modules, and
  wherein said first data block is received from a host device that is distinct from said RAID system.

44. The method of claim 43, wherein said ECC data received by said another of said target processing modules corresponds to said portion.

45. The method of claim 43, further comprising using a switching module to switch data between a data processing module and said N storage arrays, and between said N storage arrays.

46. The method of claim 45, wherein said switching module includes a multi-port high speed switch.

47. The method of claim 43, further comprising:
  assigning a data storage request for a second data block to a second target processing module for processing of error checking and correcting (ECC) data for said second data block; and
  sending a portion of said second data block and ECC data associated with said second data block from said second target processing module to a third one of said target processing modules.

48. The method of claim 47, further comprising processing said first data block and said second data block in an overlapping manner in said one of said target processing modules and said second target processing module, respectively.

49. The method of claim 43, wherein said data processing module performs at least one of operating system (OS) functions and file system (FS) protocol functions on said first data block.

50. The method of claim 49, wherein said FS protocol functions comprise at least one of a Network File Server (NFS) protocol function and a Common Internet File Server (CIFS) protocol function.

51. The method of claim 43, wherein when a data processing module receives a data retrieval request, said data processing module assigns said data retrieval request to a first one of said target processing modules,
  wherein said first one of said target processing modules retrieves data corresponding to said data retrieval request from others of said target processing modules and ECC data relating to portions of said data having errors, and
  wherein said first one of said target processing module performs data recovery on said portions using said ECC data.

52. The method of claim 43, wherein when a data processing module receives a data retrieval request, said data processing module sends data retrieval messages to said target processing modules having data corresponding to said data retrieval request.

53. The method of claim 52, wherein said target processing modules retrieve said data corresponding to said data retrieval request and ECC data relating to portions of said data having errors.

54. The method of claim 53, wherein said target processing modules perform data recovery on said portions using said ECC data.

55. The method of claim 53, wherein said target processing modules send said retrieved data corresponding to said data retrieval request and said ECC data to said data processing module, and
  wherein said data processing module performs data recovery on said portions using said ECC data.

* * * * *